(12) United States Patent
Roberts et al.

(10) Patent No.: US 8,597,806 B2
(45) Date of Patent: Dec. 3, 2013

(54) METHOD FOR OPERATING FUEL CELLS WITH PASSIVE REACTANT SUPPLY

(75) Inventors: Joy Roberts, Coquitlam (CA); Joerg Zimmermann, Vancouver (CA); Jeremy Schrooten, Mission (CA)

(73) Assignee: Societe BIC, Clichy (FR)

( * ) Notice: Subject to any disclaimer, the term of this patent is extended or adjusted under 35 U.S.C. 154(b) by 973 days.

(21) Appl. No.: 11/627,333

(22) Filed: Jan. 25, 2007

(65) Prior Publication Data

US 2007/0196701 A1  Aug. 23, 2007

Related U.S. Application Data

(60) Provisional application No. 60/743,173, filed on Jan. 25, 2006.

(51) Int. Cl.
*H01M 8/00* (2006.01)

(52) U.S. Cl.
USPC .......... 429/6; 429/9; 429/404; 429/413; 429/467; 429/471; 429/474; 429/452; 429/457; 429/507

(58) Field of Classification Search
USPC .................. 429/38, 25, 30, 13
See application file for complete search history.

(56) References Cited

U.S. PATENT DOCUMENTS

| | | | |
|---|---|---|---|
| 5,366,820 A | 11/1994 | Tsutsumi et al. | |
| 5,879,826 A | 3/1999 | Lehman | |
| 6,423,434 B1 * | 7/2002 | Pratt et al. | |
| 6,986,961 B1 * | 1/2006 | Ren et al. | 429/457 |
| 7,153,598 B2 * | 12/2006 | Summers et al. | 429/415 |
| 7,166,381 B2 | 1/2007 | Choi et al. | |
| 2004/0241504 A1 | 12/2004 | Summers et al. | |
| 2005/0271925 A1 | 12/2005 | Alday et al. | |
| 2006/0115709 A1 * | 6/2006 | Badding et al. | 429/39 |

FOREIGN PATENT DOCUMENTS

| | | |
|---|---|---|
| CN | 102820479 A | 12/2012 |
| EP | 1821356 | 8/2007 |
| JP | 04-209469 A | 7/1992 |
| JP | 2002-161997 A | 6/2002 |
| JP | 2003031241 | 1/2003 |
| JP | 2003031241 A2 | 1/2003 |
| JP | 2003217631 | 7/2003 |
| JP | 2003217631 A2 | 7/2003 |
| JP | 2003-317745 A | 11/2003 |
| JP | 2004031199 | 1/2004 |

(Continued)

OTHER PUBLICATIONS

"Recent Advanced in Direct Methanol Fuel Cells at Los Alamos National Laboratory" by Xioming Ren et al. Journal fo Power Sources 86 92000)111-116.*

(Continued)

*Primary Examiner* — Melvin C Mayes
*Assistant Examiner* — Colette Nguyen
(74) *Attorney, Agent, or Firm* — Schwegman Lundberg & Woessner, P.A.

(57) ABSTRACT

A method for operating a passive, air-breathing fuel cell system is described. In one embodiment, the system comprises one or more fuel cells, and a closed fuel plenum connected to a fuel supply. In some embodiments of the method, the fuel cell cathodes are exposed to ambient air, and the fuel is supplied to the anodes via the fuel plenum at a pressure greater than that of the ambient air.

31 Claims, 5 Drawing Sheets

(56) References Cited

FOREIGN PATENT DOCUMENTS

| JP | 2004031199 | A2 | 1/2004 |
|----|------------|----|--------|
| JP | 2004214131 |    | 7/2004 |
| JP | 2004214131 | A2 | 7/2004 |
| JP | 2004296350 |    | 10/2004 |
| JP | 2004296350 | A2 | 10/2004 |
| JP | 2004342482 |    | 12/2004 |
| JP | 2004342482 | A2 | 12/2004 |
| JP | 2005-122972 | A | 5/2005 |
| JP | 2005166516 | A2 | 6/2005 |
| JP | 2005-347252 | A | 12/2005 |
| KR | 20080094924 | A | 10/2008 |
| WO | WO-0069007 | A1 | 11/2000 |
| WO | WO-2007021924 | A2 | 2/2007 |

OTHER PUBLICATIONS

"International Search Report and Written Opinion for Application No. PCT/CA2007/000151", 11 Pages.

"Chinese Application Serial No. 200780010642.8, Office action mailed Sep. 25, 2009", 11pgs.

"Singapore Application No. 200805551-9, Office Action mailed Sep. 29, 2009", 10.

"European application serial No. 07701749.9 Office action mailed Dec. 11, 2009", 6 pgs.

"Singapore Application No. 200805551-9, Office Action mailed Oct. 21, 2010", 10 pgs.

"Canadian Application Serial No. 2,640,306, Amendment Filed Jan. 18, 2012", 2 pgs.

"Chinese Application Serial No. 200780010642.8, Response filed Apr. 12, 2010 to Office Action mailed Sep. 25, 2009", (w/ English Translation of Amended Claims), 10 pgs.

"Chinese Application Serial No. 2007800106428, Office Action mailed Dec. 31, 2011", (English Translation), 4 pgs.

"European Application Serial No. 07701749.9, Response filed Apr. 13, 2010 to Search Report mailed Dec. 11, 2009", 8 pgs.

"Indian Application Serial No. 6664/DELNP/2008, Amendment filed Jul. 31, 2010", 6 pgs.

"Singapore Application Serial No. 200805551-9, Response filed Feb. 25, 2010 to Written Opinion mailed Sep. 25, 2009", 10 pgs.

"Singapore Application Serial No. 200805551-9, Voluntary Amendment filed Sep. 12, 2008", 19 pgs.

"Singapore Application No. 200805551-9, Letters Patent granted Mar. 31, 2011".

"Japanese Application Serial No. 2008-551612, Office Action mailed Sep. 18, 2012", (w/ English Translation), 9 pgs.

"Chinese Application Serial No. 200780010642.8, Response filed Feb. 28, 2012 to Office Action mailed Dec. 31, 2011", (w/ English Translation of Amended Claims), 8 pgs.

"International Application Serial No. PCT/CA2007/000151, International Preliminary Report on Patentability mailed Aug. 7, 2008", 7 pgs.

"International Application Serial No. PCT/CA2007/000151, International Search Report and Written Opinion mailed Apr. 27, 2007", 11 pgs.

"Japanese Application Serial No. 2008-551612, Response filed Dec. 18, 2012 to Office Action mailed Sep. 18, 2012", 19 pgs.

"Korean Application Serial No. 10-2008-7020348, Amendment filed Jan. 20, 2012", 17 pgs.

\* cited by examiner

METHOD FOR OPERATING FUEL CELLS WITH PASSIVE REACTANT SUPPLY

PRIORITY OF INVENTION

This non-provisional application claims the benefit of priority under 35 U.S.C. §119(e) to U.S. Provisional Patent Application Ser. No. 60/743,173, filed Jan. 25, 2006, which is herein incorporated by reference.

FIELD

The present invention relates to fuel cells and, more particularly, to methods of operating passive, air-breathing fuel cells having closed fuel supply systems. Embodiments of the method can be used to extend operating time and achieve high fuel utilization.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2005, Angstrom Power Inc. All Rights Reserved.

BACKGROUND

Electrochemical fuel cells convert a fuel and an oxidant to electricity. Solid polymer electrochemical fuel cells generally employ an ion exchange membrane or some other kind of solid polymer electrolyte disposed between two electrodes, an anode and a cathode, each comprising a layer of catalyst to induce the desired electrochemical reaction. An embodiment of a conventional hydrogen fuel cell system is shown schematically at 10 in FIG. 1. It includes an anode 12 and a hydrogen gas inlet 14, and a cathode 18 and an air inlet 20. Hydrogen gas enters the fuel cell at the inlet 14 and is oxidized at anode 12 to form protons 16 and electrons 17. Oxygen, often from air, is reduced at cathode 18 to form water 22. The fuel cell system also includes a proton exchange membrane 24 for passage of protons from the anode 12 to the cathode 18. In addition to conducting hydrogen ions, the membrane 24 separates the hydrogen fuel stream from the oxidant stream. A conventional fuel cell also includes outlets 25 and 26 for oxidant and fuel, respectively.

In many conventional fuel cells, electrically conductive reactant flow field plates are used to direct pressurized reactant streams, which may be pressurized, to flow across the anode and cathode between the reactant stream inlet and outlet. Typically such reactant flow field plates have at least one flow passage or channel formed in one or both faces. The fluid flow field plates act as current collectors, provide support for the electrodes, provide access channels or passages for the fuel and oxidant to the respective anode and cathode surfaces, and provide passages for the removal of reaction products, such as water, formed during operation of the cell.

Fuel cell performance can suffer significantly if there is not a sufficient supply of reactant to the entire electrode. Therefore, it has been a common practice in conventional fuel cells to provide excess reactants to the fuel cell in order to assure adequate supply at the electrode. In the case of the anode electrode, this generally wastes valuable fuel—reducing the fuel utilization, which is the ratio of the quantity of fuel supplied to the quantity of fuel actually consumed to produce electrical power. Ideally all of the fuel supplied to the fuel cell is used to produce power (a fuel utilization of 1 or 100%).

Some fuel cells are designed to operate in a closed mode on one or both of the reactant sides in an attempt to try to increase the reactant utilization. In these situations the reactant used on the closed side is generally substantially pure. Nonetheless, one of the problems associated with such systems is the accumulation of non-reactive components that tend to build up on the anode and dilute the local fuel concentration. If the fuel supply needed to support the power demand is not available (even locally within a particular fuel cell in the system), the fuel cell system may experience global or localized fuel starvation. Fuel starvation can cause permanent, irrecoverable, material damage to the fuel cells resulting in lower performance or eventual failure of the system.

There are various sources of the non-reactive components that tend to accumulate at the anode in a closed fuel system. One is impurities in the fuel stream itself—even if the fuel is substantially pure with a very low concentration of other components, these will tend to build up over time in a closed system. Also water produced at the cathode and nitrogen from the air (in air breathing configurations) will tend to cross the electrolyte and accumulate at the anode A typical solution is the inclusion of a purge valve (which is normally closed in closed system operation) somewhere in the fuel passage for periodic venting of accumulations of non-reactive components, which can build up at the anode in closed system operation. In conventional fuel cell purge systems the purge valve is opened from time to time, for example, manually or at regular fixed time intervals, or in response to some monitored parameter. Alternatively, a continuous small vent of reactant may be used to prevent the accumulation of non-reactive components. The reactant flow path through the fuel cell system can be configured so that non-reactive components tend to accumulate first in just one or a few fuel cells of the fuel cell assembly, rather than in the outlet region of each cell in the assembly.

Such systems are not truly dead-ended, and although purging or a continuous vent can improve performance of fuel cells having closed fuel supply systems, it wastes valuable fuel—thereby reducing the fuel utilization. It also increases the parasitic load on the system and the complexity if purging equipment is required. Furthermore, the release of hydrogen into the ambient environment may be undesirable.

DETAILED DESCRIPTION

Figure 1:
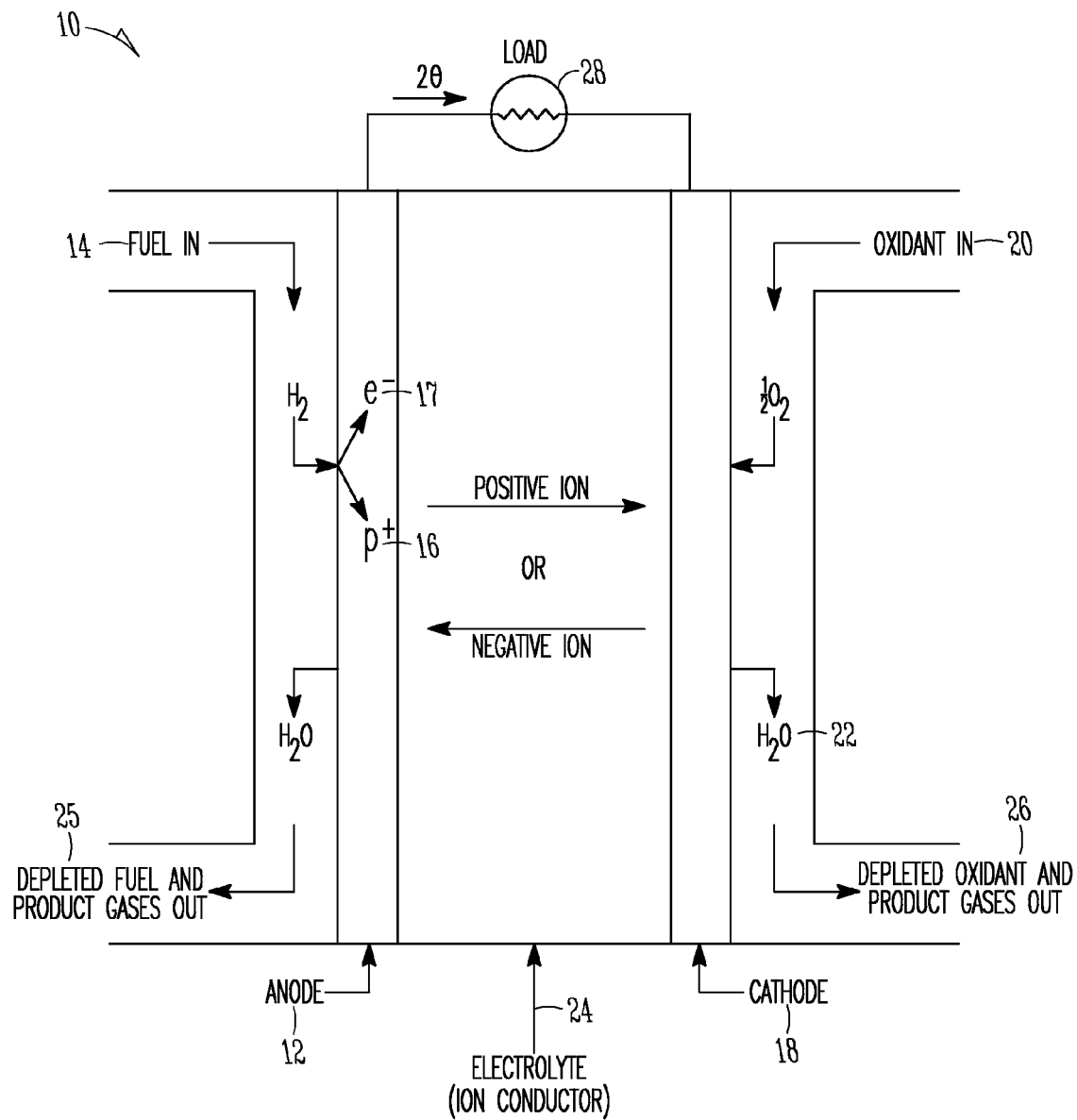
FIG. 1 is a schematic view of a conventional fuel cell.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive or unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Although detailed embodiments of the invention are disclosed herein, it is to be understood that the disclosed embodiments are merely exemplary of the invention that may be embodied in various and alternative forms. Specific structural and functional details disclosed herein are not to be interpreted as limiting, but merely as a basis for teaching one skilled in the art to variously employ the fuel cell operation embodiments. Throughout the drawings, like elements are given like numerals. Embodiments of the method for fuel cell operation described herein apply to fuel cell power generation in general, including transportation applications, portable power sources, home and commercial power generation, large power generation, small system power generation and to any other application that would benefit from the use of such a system.

The invention embodiments described herein relate to a method of operating a passive, air-breathing fuel cell that has a closed fuel supply.

As used herein, "passive" refers to the flow of a reactant utilizing no external mechanical power. For example, the flow of a reactant may be caused by diffusion or a difference in pressure gradient. Under passive operation in a fuel cell system, the pressure of a reactant may be regulated, modulated, or varied, for example.

As used herein, "dead ended" refers to a fuel cell or fuel cell system in which a fuel is not recirculated through the fuel cell or exhausted/released/expelled from the fuel supply. For example, any fuel that passes from a fuel source to one or more fuel cells is consumed by the fuel cell reaction. For dead ended operation, the fuel cell or fuel cell system includes a closed plenum, for example. Dead ended fuel cell systems include a fuel outlet which is closed for some embodiments and for other embodiments, dead ended fuel cell systems do not include a fuel outlet.

As used herein, "pressure" refers to a force applied uniformly over a surface and may be measured as force per unit of area. For example, a pressure of a reactant or fuel may be regulated or varied with use in a fuel cell system. Pressure as used herein, includes both absolute pressure measurement and relative pressure measurement.

As used herein, "purge" or "purging" refers to venting, releasing, or removing of a substance or substances. For example, for some embodiments, such substances may include accumulations of non-reactive components or contaminants. For example, non-reactive components may build up at the anode in closed fuel cell system and may be removed by purging, such as opening of a valve.

As used herein, the term "fuel supply" refers to any structure or assembly that stores a fuel. One example of a fuel is hydrogen. In a fuel supply, the fuel may be stored using a variety of mechanisms. For example, in a hydrogen fuel supply, hydrogen may be stored as a metal hydride, composite metal hydride, carbon-graphite nanofibers, compressed hydrogen gas, chemical hydrides or combinations of these materials. For some embodiments, a fuel supply also includes a fuel storage material and components in addition to the fuel storage material. For some embodiments, the fuel supply is internal, such as a fuel reservoir. For other embodiments, the fuel supply is external or removable, such as a fuel cartridge. For other embodiments, the fuel supply is a combination of internal and external components, such as a cartridge that fills a reservoir which supplies fuel to the fuel to the anodes of the fuel cell system, optionally via a fuel plenum.

As used herein, the terms "fuel plenum," "fuel enclosure" and "fuel chamber refer to structures that contain fuel, which may be in fluid contact with the anodes of a fuel cell. Fuel plenums, fuel enclosures, and fuel chambers include embodiments which are flexible, embodiments which are integrally formed in the fuel cell system, and embodiments which may be a variety of shapes and sizes.

In most conventional fuel cells there is typically forced flow of fuel to the anode, although in some cases the fuel is supplied from a pressurized source. Typically fuel cell systems also incorporate some kind of active flow control which adjusts the rate of supply of one or both reactants in response to the fuel cell power output demand or some other parameter. Often a rotameter or mass flow controller is used.

In a passive, air-breathing fuel cell, the cathode is merely exposed to ambient air. When the fuel cell is operating, the cathode consumes oxygen from the surrounding air to support the fuel cell reaction. Air is thus supplied to the cathode by diffusion. There is no active flow control of oxidant to the cathode, and there is no oxidant inlet or outlet per se. For some embodiments, fuel cell assemblies with passive reactant supply include varied, regulated, or modulated pressure operation.

The closed fuel enclosure means that the fuel supply to the fuel cell is dead-ended. Fuel fluidly contacts the anodes of the fuel cell assembly and is consumed through a reduction reaction. As fuel is consumed, it may flow from the fuel supply into a fuel plenum, for example by forced convection if the fuel is pressurized. Depending upon the configuration of the fuel flow path there may be fuel flow from one cell to the next as the reaction proceeds, but the overall assembly has a closed fuel enclosure with no outlet and no venting or bleeding of fuel on the anode side; however, it is recognized that in certain circumstances there may be small amounts of fuel lost via diffusion through the electrolyte to the cathode.

Figure 5:
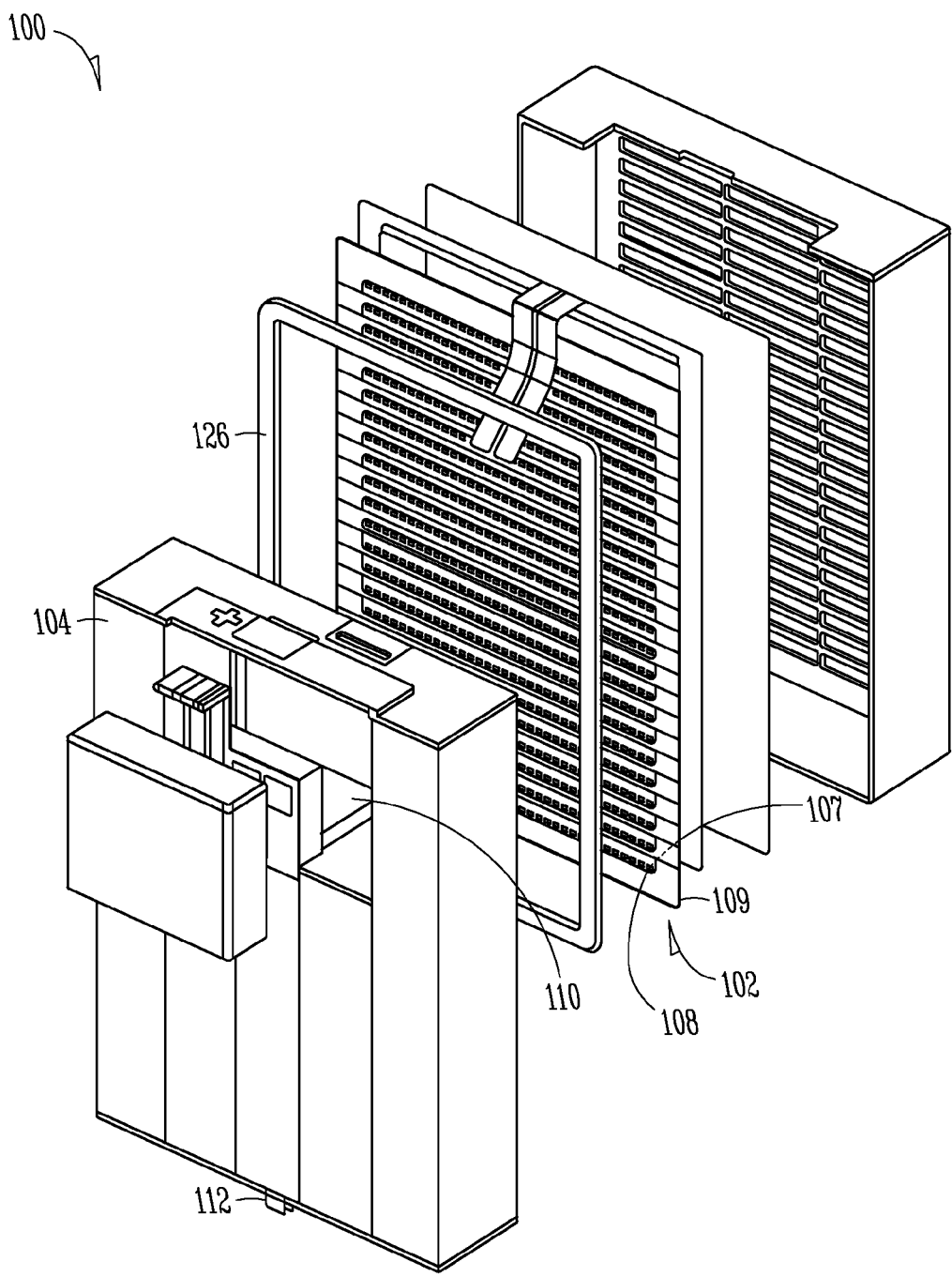
FIG. 5 is an exploded perspective view of an embodiment of a fuel cell system of the invention.

In one embodiment, a fuel cell system, shown in an exploded perspective view at 100 in FIG. 5 includes, among other things, at least one fuel cell layer 102 that includes an anode 108 and a cathode 107 with an ion-conductive electrolyte 109 disposed there between and a fuel supply (e.g. a fuel cartridge or internal fuel reservoir) 104, In various examples, fuel supply 104 optionally comprises a refueling port 112 and/or a pressure regulator 110. Refueling port 112 is a pressure activated valve that allows a flow of fluid, for example, fluid fuel, into the fuel supply 104.

A fuel enclosure, or fuel plenum, (not shown) can be created by positioning fuel cell layer 102 adjacent to at least one surface of the fuel reservoir 104. A perimeter of the fuel supply 104 surface in contact with fuel cell layer 102 may be sealed by a seal member 126, such as a (compressive or elastic) gasket or an adhesive, thereby forming a closed fuel enclosure (not shown). In the exemplary embodiment, pressure regulator 110 fluidically connects the fuel supply 104 to the fuel enclosure, or plenum (not shown).

An embodiment of the method for operating such a fuel cell system includes exposing the cathode(s) 107 to ambient air, and supplying a fuel stream to the anode(s) 108 via the fuel plenum (not shown) at a pressure greater than that of the ambient air.

The use of a positive pressure differential from the anode 108 to the cathode 107 has been found to improve the performance and/or extend the operating time and/or allow achievement of high fuel utilization in a passive, air-breathing fuel cell system. With use of a positive pressure differential, fuel utilizations greater than 75%, or even greater than 90% may be achievable.

It is believed that a higher fuel pressure on the anode impedes the migration of nitrogen from the air on the cathode side. Nitrogen accumulation in the closed fuel enclosure would eventually result in at least localized fuel starvation with a drop in fuel cell performance, and potentially eventual damage to the fuel cell itself. However, if the pressure differential is too large (fuel pressure too great) too much hydrogen crossover from the anode to the cathode will occur. This wastes fuel (reducing the fuel utilization), and can impede the oxidation reaction at the cathode.

In addition, the use of pressure differential from anode 108 to cathode 107 may allow for modification of water management behavior of the cell. This can have significant impact on cell operation as the presence of water can affect everything from proton conduction in the electrolyte to reactant gas access in the electrodes.

In some embodiments of the method the fuel is substantially pure hydrogen. For example, the hydrogen may be supplied from a compressed hydrogen source, a hydrogen storage material such as a metal hydride, a composite metal hydride, carbon-graphite nanofibers, or a chemical hydride hydrogen source. There are several metal hydrides that are possible for use as a hydrogen storage material, which are generally grouped by their crystal structure (i.e. $AB_5$, $AB_2$, AB BCC). The hydride can be a metal or metal alloy. Examples of hydrides include, but are not limited to: $LaNi_5$, FeTi, a mischmetal hydride (a mixture of metal or an ore, such as $MmNi_5$), vanadium hydride, magnesium hydride, intermetallic hydride, solid solution hydride, multiphase hydride, composite hydride, alloys thereof, or solid solutions thereof. Examples of chemical hydride hydrogen sources include, but are not limited to: sodium borohydride, sodium alanate, and lithium alanate.

In some embodiments the fuel is supplied to the fuel enclosure via a pressure regulator, for example, as shown at 110 in FIG. 5. The fuel may be supplied at constant pressure or variable pressure. The pressure at which the fuel is supplied may be modulated in response to an aspect of system performance, such as power demand of the fuel cell or fuel cell layer, for example. The fuel is supplied without active flow control (e.g. without using mass flow meter or rotameter); in some embodiments of the method, the pressure at which the fuel is supplied to the anode can be independent of the power demanded from the fuel cell or fuel cell layer, for example, as shown at 102 in FIG. 5. In some embodiments the pressure of fuel supplied to the fuel enclosure (not shown) is unregulated.

For example, the fuel enclosure may be fluidly connected to a metal hydride hydrogen storage system so that it accepts hydrogen from the metal hydride at whatever pressure the hydrogen is discharged from the metal hydride. The method embodiments described herein may be implemented in a wide variety of fuel cell architectures that can be configured to be passive, air-breathing fuel cells. For example, embodiments of the method can be used with fuel cell assemblies of the types described in commonly owned U.S. patent application Ser. Nos. 10/887,519 entitled COMPACT CHEMICAL REACTOR; 10/818,610 entitled COMPACT CHEMICAL REACTOR WITH REACTOR FRAME; 10/818,611 entitled FUEL CELL LAYER; 10/818,843 entitled FUEL CELL LAYER WITH REACTOR FRAME; and 11/047,557 entitled ELECTROCHEMICAL FUEL CELLS FORMED ON PLEATED SUBSTRATES all incorporated herein by reference. As another example, embodiments of the method can be used with fuel cell assemblies of the type described in commonly owned U.S. patent application Ser. No. 11/047,560 entitled ELECTROCHEMICAL FUEL CELLS HAVING CURRENT-CARRYING STRUCTURES UNDERLYING REACTION LAYERS (also incorporated herein by reference) that include planar fuel cell arrays.

Fuel cells within the assembly can be electrically connected in parallel or in series, or in sub-groups comprising combinations of the two. Implementation of the present method is essentially independent of the way in which the fuel cells in the assembly are electrically connected to one another The closed fuel enclosure can be configured in a variety of ways. For example it may be configured so that the fuel is supplied to each of a plurality of anodes in parallel, or so that the fuel is supplied to some or all of anodes in series, or in some other configuration. Again, implementation of the present method embodiments is independent of the way in which the anodes in the assembly are fluidly connected to one another, although it may be optimized for a particular design.

It is not a requirement for the fuel cell assemblies to incorporate discrete flow channels for directing reactants across the surface of the electrodes, as in conventional fuel cells.

In some embodiments, it is contemplated that the fuel supply 104 is directly coupled to the fuel cell assembly so that the fuel is integrally contained between anodes and fuel supply in such a way that a fuel plenum is no longer an explicit component of the fuel cell system, but instead may be considered to be implicitly created through integration of other components of the system. In some embodiments, the fuel plenum is directly integrated into the fuel supply, such that the fuel supply and the fuel plenum essentially become one entity.

Exposed cathodes may require protection from a variety of hazards. Such hazards could include, but are not limited to, physical damage such as abrasion or puncture, excess drying, excess moisture and airborne contaminants such as $SO_2$, CO, and $CO_2$, that can be detrimental to the performance of the catalyst and/or fuel cell. Accordingly, the fuel cell system may include mechanisms for protecting the cathodes. In addition, such mechanisms may also be used to affect, modify, and/or control the water management aspects of the system. Examples of such mechanisms include, but are not limited to:

1. A carbon layer deposited within the gas diffusion layer that is activated to absorb contaminants.

2. A hydrophobic layer deposited on the surface of the fuel cell that renders the cathode water repellent.

3. A porous cover over the fuel cell comprised of:
   i. a porous, hydrophobic Teflon® sheet
   ii. a porous activated carbon filter
4. A screen or mesh cover.

These mechanisms for protecting the cathodes may be used independently or in collaboration with one another. It is understood that these mechanisms are only examples of methods to protect the cathodes, not an exhaustive list.

In some embodiments, the fuel cell system includes a fuel enclosure inlet and a fuel enclosure outlet, which is plugged. For some embodiments, the fuel cell system does not include a fuel enclosure outlet at all. The fuel cell system may include a cathode that is exposed to, or in fluid contact with, the surrounding air. The fuel cell system also includes an electrolyte disposed between an anode and a cathode. For some embodiments, the electrolyte comprises an ion exchange membrane, or ion conductive electrolyte.

If present, the fuel enclosure outlet is plugged in order to prevent hydrogen from venting from the fuel cell system, effectively dead-ending the fuel enclosure. Method embodiments described herein also include operating the fuel cell system at a fuel pressure that is effective for reducing nitrogen diffusion across the electrolyte.

The method embodiments described herein improve fuel cell efficiency and performance by identifying an effective fuel pressure and applying that fuel pressure to the fuel cell operation. The fuel pressure could be chosen in order to modify and/or control the water balance across the fuel cell. The operation point of the fuel cell may be selected by evaluating operating variables such as but not limited to temperature, pressure, gas composition, reactant utilizations, water balance, and current density as well as other factors such as impurities and cell life that influence the ideal cell potential and the magnitude of the voltage losses. In prior art systems, there is often a 'time delay' between a change in load applied to the system, and the system responding to the change in applied load. Method embodiments of the invention described herein eliminate the time delay and problems resulting from the time delay because the method embodiments of the invention rely upon a constant application of an internal fuel feed pressure to the fuel enclosure. For some embodiments, the internal fuel feed pressure is pre-selected. No other fuel feed control is required. For some embodiments, the only means of fuel feed control is a pressure regulator. For some embodiments, instead of being pre-selected, the fuel feed pressure is controlled through the pressure regulator and can be modified based on any number of desired parameters, for example, environmental conditions, power demand, and/or quantity of fuel.

Because the fuel is provided to the fuel cell system in excess of the reaction demand, the fuel control allows for more flexible operation without dynamic control. Control of pressure rather than flow rate allows for improved, stabilized, fuel supply control. Additionally, control of fuel supply by use of pressure control rather than flow rate simplifies fuel supply to a fuel cell or fuel cell stack because the pressure control is independent of load demands. While feedback control has been described for regulating pressure of the fuel to the fuel cell, assembly, it is understood that other types of control may be suitable for specific types of applications. The fuel cell system also includes, for some embodiments, sealants, such as those shown at 126 in FIG. 5, that prevent loss of fuel from the fuel cell system. The fuel cell system may also include a positive electrical connector and negative electrical connectors.

Examples of application of method embodiments described are presented herein. The Examples are presented to better describe the method embodiments and not to limit them.

The area of each individual fuel cell in the planar array can be in the range of 0.00000001 $cm^2$ to 1000 $cm^2$.

EXAMPLE 1

Figure 2:
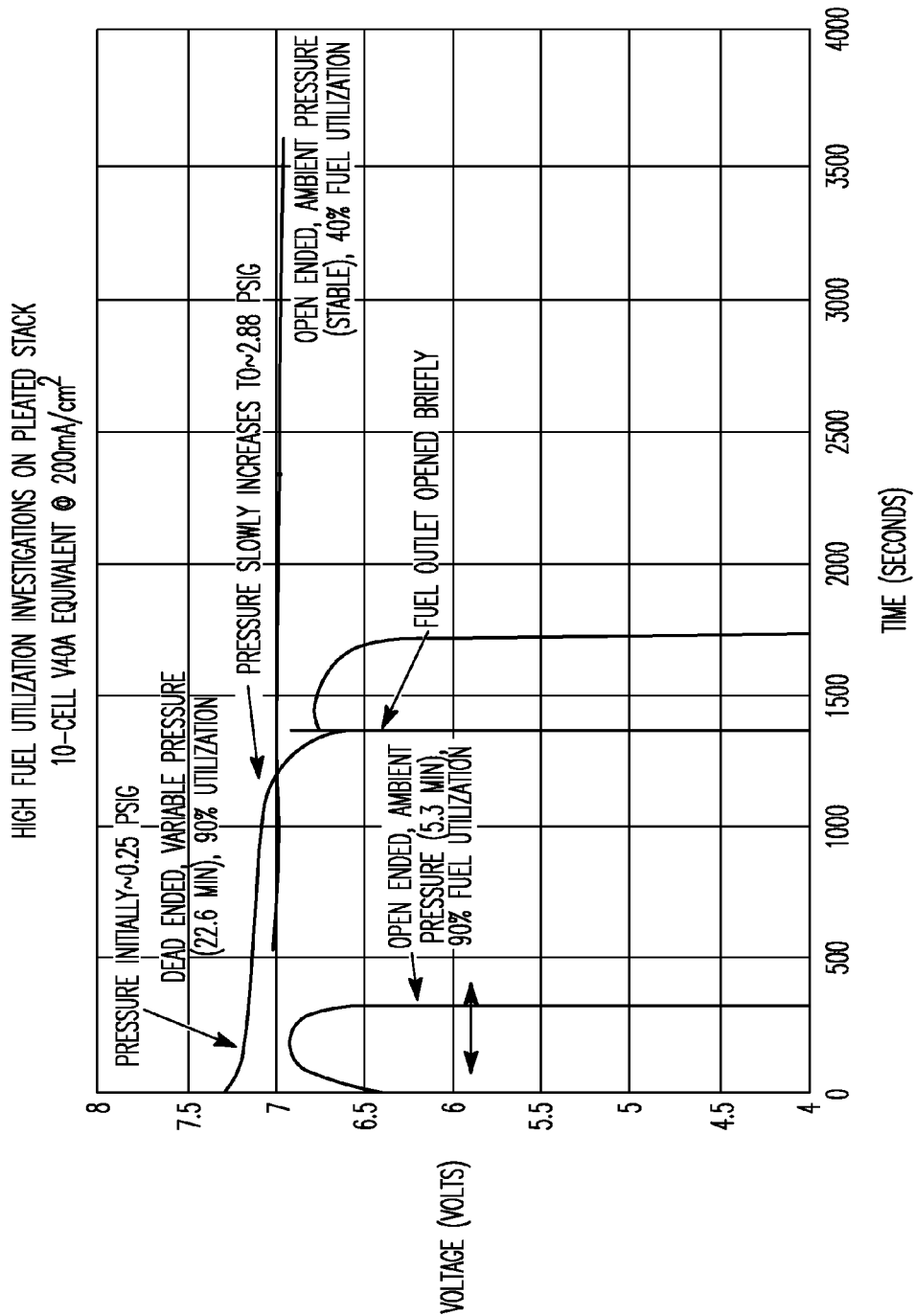
FIG. 2 is a graphical view showing fuel cell voltage against operating time for a passive, air-breathing 10-cell fuel cell system operated under a variety of conditions.

The test results shown in FIG. 2 illustrate the difficulty in attaining extended operating times and stable performance at the same time as achieving high fuel utilization. FIG. 2 illustrates the operation of a fuel cell system in both dead-ended and open-ended modes with different fuel utilizations. In all four tests the fuel cell cathodes were merely exposed to ambient air for the supply of oxidant; pure unhumidified hydrogen from a compressed gas cylinder was directed to the anodes. The fuel cell studied was 10-cell assembly operated at 200 $mA/cm^2$ Curve A shows the voltage against operating time when the fuel cell system was operated open-ended at less than 1 psig of hydrogen pressure (i.e. with hydrogen flowing past the anodes and exiting via an outlet). The flow rate was such that the fuel utilization was about 90%—in other words, most of the hydrogen supplied to the anode was consumed. At this high fuel utilization (and correspondingly low hydrogen flow rate) the fuel cell performance decayed dramatically after only about 5 minutes.

Curve B, the flat curve that goes all the way across the graph, shows the same type of open-ended operation but at a flow rate such that the fuel utilization was only about 40%—in other words substantial excess hydrogen was supplied to the anode and exited the fuel cell system via a fuel outlet. Under these conditions the fuel cell exhibited stable performance for more than an hour (at which time the test was intentionally stopped).

Curve C, the curve with 2 dips, shows the same fuel cell system operating dead-ended on hydrogen (the fuel outlet was closed) with a hydrogen utilization of about 90%. The pressure differential from anode to cathode was initially about 0.25 psig. As the voltage began to decline the anode-to-cathode pressure differential was increased to about 2.85 psig. Despite the increase in fuel pressure the fuel cell voltage decayed dramatically after only about 20 minutes. Upon opening the fuel outlet valve briefly and allowing a small amount of hydrogen to vent from the fuel cell system, the fuel cell voltage was restored for a short period but decayed again within minutes with the outlet closed, despite the pressure differential of about 2.85 psig.

EXAMPLE 2

Figure 3:
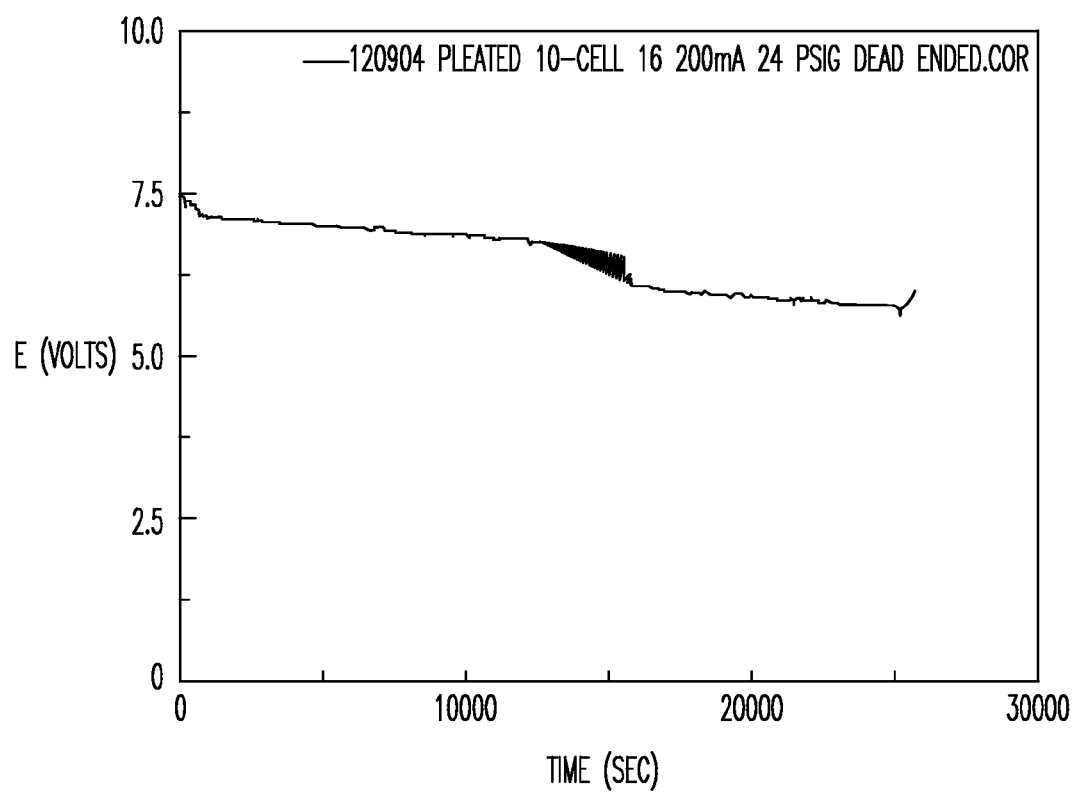
FIG. 3 is a graphical view showing fuel cell voltage against operating time volts for a passive, air-breathing 10-cell fuel cell system operated dead-ended on hydrogen with an approximately 24 psig pressure differential from anode to cathode.

In this Example the same 10-cell assembly as in Example 1 was operated dead-ended on hydrogen with a much higher anode-to-cathode pressure differential—this time about 24 psig. Again the cathodes were merely exposed to ambient air for the supply of oxidant. A graph of voltage against operating time during this dead-ended operation is shown in FIG. 3. The graph shows that the fuel cell operated at a voltage of between about 7.0 and 7.5 volts for over 25,000 seconds (almost 7 hours), at which time the test was intentionally stopped. This illustrates the advantage of using a high pressure differential in a passive, air-breathing fuel cell system that is dead-ended on the fuel side. For this particular type and size of fuel cell system under these operating conditions a 2.85 psig differential was not sufficient (as shown by Example 1), but a 24 psig pressured differential gave a significant improvement in operating time.

EXAMPLE 3

Figure 4:
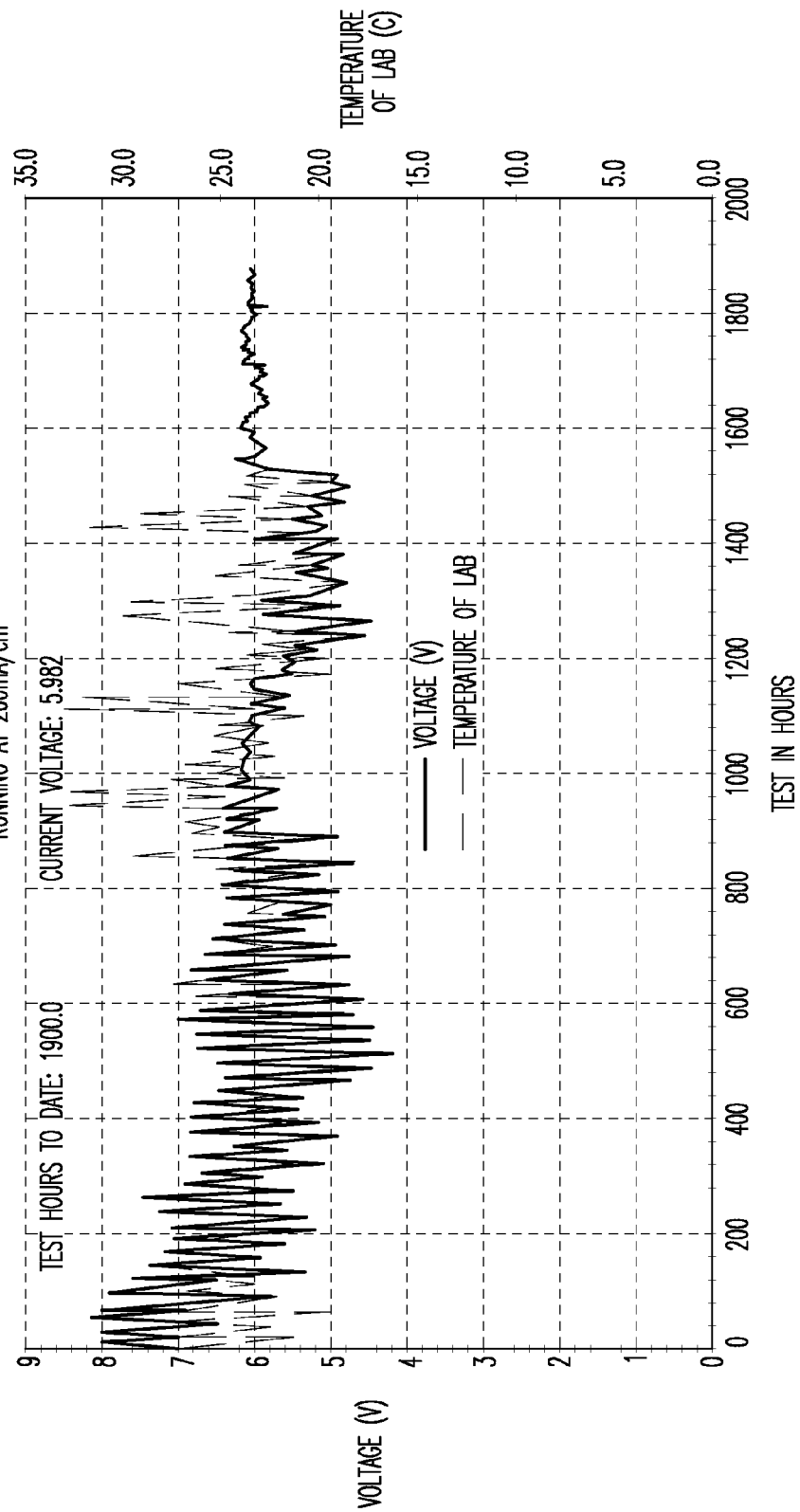
FIG. 4 is a graphical view showing fuel cell voltage against operating time for extended dead-ended operation of a passive, air-breathing planar fuel cell array with an approximately 5 psig pressure differential from anode to cathode.

In this Example the present method was tested using a fuel cell architecture different from that utilized in Examples 1 and 2 (as described in ELECTROCHEMICAL FUEL CELLS HAVING CURRENT-CARRYING STRUCTURES UNDERLYING REACTION LAYERS), voltage versus operating time was measured at 200 mA/cm$^2$, as shown in FIG. 4. The surrounding temperature was also monitored, and is shown in the graph. Again the fuel cell cathodes were merely exposed to ambient air for the supply of oxidant. Hydrogen was supplied to the anodes, which were dead-ended, at a pressure of about 5 psig. The data show that the stack operated within a voltage range of 4 to 8 Volts for about 1900 hours (over 10 weeks). The hydrogen remained dead-ended throughout—no venting or purging. The ambient temperature ranged from about 20 to 35° C.

Thus, for this particular fuel cell architecture under these operating conditions an anode-to-cathode pressure differential of 5 psig was sufficient to allow stable, dead-ended operation on hydrogen for an extended period of time.

For some embodiments, fuel cell assemblies employed in the methods described herein are integrated into a housing of an electrically powered device. The integration of fuel cells with the housing of an electrically powered device provides the opportunity for portions of the cathode region of the fuel cells to form a portion of the exterior of the device enclosure. This can save space. In some embodiments, the cathodes are exposed to the surrounding environment, while the anodes and fuel plenum are located on an inner surface of the fuel cell system. It is contemplated that the method and fuel cell embodiments described herein can be incorporated into an electronic device. Such electronic device could be, for example, the following: a cellular phone, a PDA, a satellite phone, a laptop computer, a portable DVD player, portable CD player, a portable personal care device, portable stereo, a portable televisions, a radar, a radio transmitter, radar detectors, a laptop computer, and combinations thereof.

In the description of some embodiments of the invention, reference has been made to the accompanying drawings which form a part hereof, and in which are shown, by way of illustration, specific embodiments of the invention which may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the invention. The following detailed description is not to be taken in a limiting sense, and the scope of the invention is defined only by the appended claims, along with the full scope of equivalents to which such claims are entitled.

What is claimed is:

1. A method for operating a fuel cell system with a passive reactant supply,
    providing a fuel cell system, the fuel cell system comprising a first fuel cell layer that includes a plurality of anodes, a plurality of cathodes, and an ion-conducting electrolyte, the plurality of anodes and plurality of cathodes arranged in a planar array with the plurality of anodes arranged adjacently on a first side of the first fuel cell layer and the plurality of cathodes arranged adjacently on a second side of the first fuel cell layer opposite the first side, wherein an area of each individual fuel cell in the planar array is in the range of 0.00000001 cm$^2$ to 1000 cm$^2$, the fuel cell system further comprising a closed fuel supply fluidly in contact with the plurality of anodes;
    exposing the cathodes of the planar array to ambient air; and
    supplying a fuel to the anodes of the planar array at a pressure greater than that of the ambient air;
    wherein a fuel utilization of the system is greater than 75%.

2. The method of claim 1 wherein the fuel is hydrogen.

3. The method of claim 1 wherein the fuel utilization is greater than 90%.

4. The method of claim 1 comprising controlling a fuel supply pressure using at least one pressure regulator.

5. The method of claim 1 wherein the fuel supply comprises a hydrogen storage material selected from the group consisting of: a metal hydride, a composite metal hydride, carbon-graphite nanofibers, compressed hydrogen gas, and a chemical hydride.

6. The method of claim 1 comprising supplying the fuel to the plurality of anodes at a substantially constant pressure.

7. The method of claim 1 comprising providing the fuel to the plurality of anodes at a pressure that is independent of a power demand of the fuel cell system.

8. The method of claim 1 wherein supplying a fuel comprises providing the fuel without providing components of pressure regulation between the closed fuel supply and the plurality of anodes.

9. The method of claim 1, comprising providing the fuel supplied to the anodes at a pressure that is dependent on a power demand of the fuel cell system.

10. The method of claim 1, wherein supplying a fuel comprises providing the fuel through one or more pressure control components disposed between the closed fuel supply and the plurality of anodes.

11. The method of claim 1, wherein supplying a fuel comprises providing the fuel to the anodes from a metal hydride.

12. The method of claim 1 wherein supplying a fuel comprises providing the fuel in a non-humidified form.

13. The method of claim 1 wherein supplying a fuel comprises providing the fuel to each of the plurality of anodes in parallel.

14. The method of claim 1 wherein supplying a fuel comprises providing the fuel to at least a portion of the plurality of anodes in series.

15. The method of claim 1 wherein the ion-conducting electrolyte comprises a proton exchange membrane.

16. The method of claim 1 wherein the ion-conductive electrolyte comprises a polymeric perfluorosulfonic acid.

17. The method of claim 1 wherein an ion-conductivity of the ion-conductive electrolyte is dependent on a hydration level of the ion-conductive electrolyte.

18. The method of claim 1 wherein a thickness of the ion-conductive electrolyte is in the range of 1 micron to 100 microns.

19. The method of claim 1, wherein the fuel cell system is integrated into a housing of one or more of a portable electrical power source, cellular phone, PDA, satellite phone, laptop computer, portable DVD player, portable CD player, portable personal care device, portable stereo, portable television, radio transmitter, radar transmitter, radar detector, laptop computer, any portable electronic device, any portable communication device and combinations thereof.

20. The method of claim 1, wherein the fuel pressure is modulated.

21. The method of claim 1, wherein fuel is not released from the fuel cell system by purging or venting the fuel from the anodes.

22. A method for operating a fuel cell system, the method comprising:
providing a fuel cell system, the fuel cell system comprising at least one planar fuel cell layer and a passive reactant supply, the fuel cell system further comprising at least two anodes, at least two cathodes, with an ion-conductive electrolyte disposed between each anode and cathode and the at least two anodes arranged adjacently on a first side of the planar fuel cell layer and the at least two cathodes arranged adjacently on a second side of the planar fuel cell layer opposite the first side, wherein an area of each individual fuel cell in the planar array is in the range of 0.00000001 cm$^2$ to 1000 cm$^2$, the fuel cell system further comprising a fluidly-coupled fuel supply;
pressurizing the fuel supply to a pressure greater than an ambient pressure; and
exposing the cathode of the at least one planar fuel cell to ambient air;
wherein a fuel utilization of the system is greater than 75%.

23. The method according to claim 22 wherein the fuel supply comprises a metal hydride.

24. The method of claim 22, further comprising a closed fuel plenum sealably enclosing the anodes, wherein the fuel plenum is in fluid communication with the fuel supply, wherein the method further comprises supplying a fuel to the anodes of the planar fuel cell array via the fuel plenum at a pressure greater than that of the ambient air.

25. The method of claim 22, further comprising supplying fuel to the at least two anodes at a pressure greater than that of the ambient air, wherein the pressure is selected so that during steady state operation, the at least one planar fuel cell achieves water balance such that the amount of water produced by the fuel cell system is substantially equal to the amount of water discharged from the fuel cell system.

26. The method of claim 22, further comprising supplying fuel to the at least two anodes of the planar fuel cell array at a pressure greater than that of the ambient air, wherein the pressure is effective in reducing nitrogen diffusion from the cathodes to the anodes of the planar fuel cell array and for maintaining adequate hydration of the electrolyte.

27. A method of operating a planar array of fuel cells, the method comprising:
providing a planar array of fuel cells comprising at least two unit fuel cells arranged on a single fuel cell layer, wherein an area of each individual fuel cell in the planar array is in the range of 0.00000001 cm$^2$ to 1000 cm$^2$;
providing an enclosure proximate to anode portions of the planar array that sealably encloses the anode portions of the planar array;
admitting a fuel into the enclosure and retaining the fuel within the enclosure while maintaining a predetermined fuel pressure; and
exposing cathode portions of the planar array to ambient air;
wherein the predetermined fuel pressure is greater than a pressure of the ambient air;
wherein a fuel utilization of the planar array is greater than 75%.

28. The method of claim 27, wherein exposing cathode portions of the planar array to ambient air comprises supplying the ambient air to the cathode substantially by diffusion.

29. The method of claim 27, comprising disposing one or more protective layers on the exposed cathode portions, including at least one of a carbon layer and a hydrophobic layer.

30. The method of claim 27, comprising positioning a porous protective cover proximate the exposed cathode portions, including at least one of a hydrophobic sheet, an activated carbon filter, and a screen or mesh.

31. The method of claim 27, further comprising:
coupling the planar array of fuel cells to an electrical load; and
transferring electrical energy from the planar array of fuel cells to an electrical load.

* * * * *

UNITED STATES PATENT AND TRADEMARK OFFICE
CERTIFICATE OF CORRECTION

| | | |
|---|---|---|
| PATENT NO. | : 8,597,806 B2 | Page 1 of 1 |
| APPLICATION NO. | : 11/627333 | |
| DATED | : December 3, 2013 | |
| INVENTOR(S) | : Roberts et al. | |

It is certified that error appears in the above-identified patent and that said Letters Patent is hereby corrected as shown below:

In the Specification:

In column 2, line 25, after "anode", insert --.--, therefor

In column 4, line 21, after "fuel", delete "to the fuel", therefor

In column 4, line 24, after "chamber", insert --"--, therefor

In column 4, line 63, delete "104," and insert --104.¶--, therefor

In column 6, line 29, after "another", insert --.--, therefor

In column 8, line 20, after "mA/cm$^2$", insert --.--, therefor

In column 9, line 40, after "stereo,", delete "a", therefor

In the Claims:

In column 9, line 59, in Claim 1, after "supply,", insert --the method comprising:--, therefor Signed and Sealed this
Twenty-fifth Day of March, 2014

Michelle K. Lee
*Deputy Director of the United States Patent and Trademark Office*